(12) United States Patent
Enjo et al.

(10) Patent No.: US 11,861,245 B2
(45) Date of Patent: Jan. 2, 2024

(54) PRINTING METHOD, PRINTING SYSTEM, AND NON-TRANSITORY COMPUTER-READABLE RECORDING MEDIUM RECORDING PRINT CONTROL PROGRAM FOR SCHEDULING OF PRINTING HAVING AN AUTOMATIC SWITCHING FUNCTION FOR ROLL PAPER

(71) Applicant: SCREEN HOLDINGS CO., LTD., Kyoto (JP)

(72) Inventors: Tatsuya Enjo, Kyoto (JP); Kazuyuki Matsuoka, Kyoto (JP); Satoru Kiyohara, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 0 days.

(21) Appl. No.: 18/161,250

(22) Filed: Jan. 30, 2023

(65) Prior Publication Data
US 2023/0305766 A1    Sep. 28, 2023

(30) Foreign Application Priority Data
Mar. 25, 2022    (JP) ................. 2022-049274

(51) Int. Cl.
G06F 3/12    (2006.01)
H04N 1/00    (2006.01)
B41J 11/42    (2006.01)

(52) U.S. Cl.
CPC ............. *G06F 3/1215* (2013.01); *B41J 11/42* (2013.01); *G06F 3/1229* (2013.01); *G06F 3/1253* (2013.01); *G06F 3/1262* (2013.01); *G06F 3/1263* (2013.01); *H04N 1/00665* (2013.01)

(58) Field of Classification Search
None
See application file for complete search history.

(56) References Cited

U.S. PATENT DOCUMENTS

| | | | | |
|---|---|---|---|---|
| 2012/0154866 | A1* | 6/2012 | Chatow | G06F 3/1218 358/1.15 |
| 2017/0257508 | A1* | 9/2017 | Kawasaki | H04N 1/2338 |
| 2017/0322758 | A1* | 11/2017 | Kothari | G06F 3/1262 |
| 2018/0260171 | A1 | 9/2018 | Inoda | |
| 2021/0064305 | A1* | 3/2021 | Kikumoto | G06F 3/1205 |

FOREIGN PATENT DOCUMENTS

| | | |
|---|---|---|
| JP | 2009-137235 A | 6/2009 |
| JP | 2018-151810 A | 9/2018 |
| JP | 2021-123076 A | 8/2021 |

\* cited by examiner

*Primary Examiner* — Henok Shiferaw
(74) *Attorney, Agent, or Firm* — Rimon P.C.

(57) ABSTRACT

After the end of initial processing, such as a setting of a priority mode, a print schedule (a job execution schedule and a roll paper loading schedule) is created in consideration of the type, the remaining amount, and the like of roll paper loaded in each of a plurality of slots constituting an autochanger. Then, a possible loading time is obtained, which is a time at which roll paper can be loaded into a loading target slot that is a slot in which the roll paper is to be loaded during execution of continuous printing.

15 Claims, 19 Drawing Sheets

| PRINTING ORDER | JOB NAME | TYPE OF ROLL PAPER | PRINT DISTANCE | PRINT TIME |
|---|---|---|---|---|
| 1 | JOB J1 | TYPE TD | 1800m | 18 MINUTES |
| 2 | JOB J2 | TYPE TD | 1400m | 14 MINUTES |
| 3 | JOB J3 | TYPE TA | 900m | 9 MINUTES |
| 4 | JOB J4 | TYPE TA | 1600m | 16 MINUTES |
| 5 | JOB J5 | TYPE TB | 400m | 4 MINUTES |
| 6 | JOB J6 | TYPE TC | 1200m | 12 MINUTES |
| 7 | JOB J7 | TYPE TB | 500m | 5 MINUTES |
| 8 | JOB J8 | TYPE TA | 800m | 8 MINUTES |

| PRINTING ORDER | JOB NAME | TYPE OF ROLL PAPER | PRINT DISTANCE | PRINT TIME |
|---|---|---|---|---|
| 1 | JOB J5 | TYPE TB | 400m | 4 MINUTES |
| 2 | JOB J7 | TYPE TB | 500m | 5 MINUTES |
| 3 | JOB J1 | TYPE TD | 1800m | 18 MINUTES |
| 4 | JOB J2 | TYPE TD | 1400m | 14 MINUTES |
| 5 | JOB J4 | TYPE TA | 1600m | 16 MINUTES |
| 6 | JOB J8 | TYPE TA | 800m | 8 MINUTES |
| 7 | JOB J3 | TYPE TA | 900m | 9 MINUTES |
| 8 | JOB J6 | TYPE TC | 1200m | 12 MINUTES |

Fig. 10

| SLOT No. | CURRENT ROLL TYPE / SERIAL No. | ROLL TYPE SCHEDULED TO BE LOADED / SERIAL No. | POSSIBLE LOADING START TIME | POSSIBLE LOADING TIME LENGTH |
|---|---|---|---|---|
| 1 | TYPE TA / A123 | | LOADING UNNECESSARY | |
| 2 | TYPE TB / B456 | TYPE TA / A808 | 10:04 | 42 MINUTES |
| 3 | TYPE TB / B987 | TYPE TC / C299 | 10:09 | 60 MINUTES |
| 4 | TYPE TD / D357 | | LOADING UNNECESSARY | |

| PRINTING ORDER | JOB NAME | TYPE OF ROLL PAPER | PRINT DISTANCE |
|---|---|---|---|
| 1 | JOB J1 | TYPE TA | 2000m |
| 2 | JOB J2 | TYPE TB | 300m |
| 3 | JOB J3 | TYPE TC | 500m |
| 4 | JOB J4 | TYPE TA | 1000m |

Fig.15

| PRINTING ORDER | JOB NAME | TYPE OF ROLL PAPER | PRINT DISTANCE |
|---|---|---|---|
| 1 | JOB J1 | TYPE TA | 2000m |
| 2 | JOB J4 | TYPE TA | 1000m |
| 3 | JOB J2 | TYPE TB | 300m |
| 4 | JOB J3 | TYPE TC | 500m |

| PRINTING ORDER | JOB NAME | TYPE OF ROLL PAPER | PRINT DISTANCE |
|---|---|---|---|
| 1 | JOB J1 | TYPE TA | 2000m |
| 2 | JOB J2 | TYPE TB | 1500m |
| 3 | JOB J3 | TYPE TC | 300m |
| 4 | JOB J4 | TYPE TD | 500m |
| 5 | JOB J5 | TYPE TA | 400m |
| 6 | JOB J6 | TYPE TB | 150m |

| PRINTING ORDER | JOB NAME | TYPE OF ROLL PAPER | PRINT DISTANCE |
|---|---|---|---|
| 1 | JOB J1 | TYPE TA | 2000m |
| 2 | JOB J2 | TYPE TB | 100m |
| 3 | JOB J3 | TYPE TC | 300m |
| 4 | JOB J4 | TYPE TD | 500m |
| 5 | JOB J5 | TYPE TA | 400m |
| 6 | JOB J6 | TYPE TB | 150m |

| PRINTING ORDER | JOB NAME | TYPE OF ROLL PAPER | PRINT DISTANCE |
|---|---|---|---|
| 1 | JOB J2 | TYPE TB | 100m |
| 2 | JOB J6 | TYPE TB | 150m |
| 3 | JOB J3 | TYPE TC | 300m |
| 4 | JOB J4 | TYPE TD | 500m |
| 5 | JOB J5 | TYPE TA | 400m |
| 6 | JOB J1 | TYPE TA | 2000m |

Fig.24

| PRINTING ORDER | JOB NAME | TYPE OF ROLL PAPER | PRINT DISTANCE |
|---|---|---|---|
| 1 | JOB J1 | TYPE TA | 2000m |
| 2 | JOB J2 | TYPE TB | 100m |
| 3 | JOB J3 | TYPE TC | 300m |
| 4 | JOB J4 | TYPE TD | 3000m |
| 5 | JOB J5 | TYPE TA | 400m |
| 6 | JOB J6 | TYPE TB | 150m |

Fig.25

| PRINTING ORDER | JOB NAME | TYPE OF ROLL PAPER | PRINT DISTANCE |
|---|---|---|---|
| 1 | JOB J4 | TYPE TD | 3000m |
| 2 | JOB J3 | TYPE TC | 300m |
| 3 | JOB J2 | TYPE TB | 100m |
| 4 | JOB J6 | TYPE TB | 150m |
| 5 | JOB J5 | TYPE TA | 400m |
| 6 | JOB J1 | TYPE TA | 2000m |

| PRINTING ORDER | JOB NAME | TYPE OF ROLL PAPER | PRINT DISTANCE |
|---|---|---|---|
| 1 | JOB J1 | TYPE TA | 2000m |
| 2 | JOB J2 | TYPE TB | 2000m |
| 3 | JOB J3 | TYPE TC | 4000m |
| 4 | JOB J4 | TYPE TD | 3000m |
| 5 | JOB J5 | TYPE TA | 400m |
| 6 | JOB J6 | TYPE TB | 3000m |

| PRINTING ORDER | JOB NAME | TYPE OF ROLL PAPER | PRINT DISTANCE |
|---|---|---|---|
| 1 | JOB J1 | TYPE TA | 2000m |
| 2 | JOB J5 | TYPE TA | 400m |
| 3 | JOB J2 | TYPE TB | 2000m |
| 4 | JOB J6 | TYPE TB | 3000m |
| 5 | JOB J3 | TYPE TC | 4000m |
| 6 | JOB J4 | TYPE TD | 3000m |

PRINTING METHOD, PRINTING SYSTEM, AND NON-TRANSITORY COMPUTER-READABLE RECORDING MEDIUM RECORDING PRINT CONTROL PROGRAM FOR SCHEDULING OF PRINTING HAVING AN AUTOMATIC SWITCHING FUNCTION FOR ROLL PAPER

BACKGROUND OF THE INVENTION

Field of the Invention

The present invention relates to a printing method, and more particularly to the scheduling of printing in a printing system having an automatic switching function for roll paper.

Description of Related Art

In recent years, inkjet printing apparatuses capable of continuous printing using roll paper (roll-shaped printing paper) have been widely used as digital printing apparatuses for printing without printing plates. The printing using roll paper, that is, printing on continuous paper, achieves high productivity compared to printing on sheet-fed paper. Further, an inkjet printing apparatus with an automatic switching function for roll paper has been developed to further increase productivity. According to the automatic switching function for roll paper, when the remaining amount of roll paper in use becomes small, the terminal end of the roll paper in use and the starting end of new roll paper are automatically joined without requiring manpower. This makes it possible to continue continuous printing without stopping the operation of the apparatus even when switching to new roll paper is required during execution of printing. Note that an apparatus including a plurality of slots each for holding roll paper and having an automatic switching function for roll paper to be used for printing (roll paper supplied to the body of the printing apparatus) is called an "autochanger".

The following prior art documents are known in connection with the present invention. Japanese Laid-Open Patent Publication No. 2009-137235 discloses an invention of a printing apparatus that reduces the number of times of roll paper replacements and achieve a reduction in total printing time by grouping print jobs for each type of paper (i.e., for type of roll paper) to be used and then determining the printing order so that print jobs included in a group corresponding to the type of paper set in the printing apparatus are executed preferentially. Japanese Laid-Open Patent Publication No. 2018-151810 discloses an invention of a printing system in which print jobs are grouped and then sorted according to a pre-registered sorting policy so that the number of times of roll paper replacements is reduced.

According to the invention disclosed in Japanese Laid-Open Patent Publication No. 2009-137235 and Japanese Laid-Open Patent Publication No. 2018-151810, print jobs are grouped so that print jobs using the same type of roll paper are in the same group, and hence the number of roll paper replacements can be reduced as much as possible. However, even when the number of times of roll paper replacements decreases, productivity cannot be enhanced if there is a need to stop the printing operation accompanying the roll paper replacement.

In addition, when print jobs that use a different type of roll paper from the roll paper loaded in each of the plurality of slots constituting the autochanger (hereinafter referred to as a "Job JX" for convenience) are included among the plurality of print jobs subject to continuous printing, the roll paper of the paper type associated with the job JX needs to be loaded in a slot by the scheduled start time of printing based on the job JX in order not to stop the printing operation. However, neither Japanese Laid-Open Patent Publication No. 2009-137235 nor Japanese Laid-Open Patent Publication No. 2018-151810 describes anything about not stopping the printing operation.

SUMMARY OF THE INVENTION

Therefore, an object of the present invention is to provide a printing method capable of preventing a decrease in printing productivity due to switching of roll paper to be used for printing and loading of roll paper into a slot.

One aspect of the present invention is directed to a printing method in a printing system including a printer configured to perform printing on continuous paper and an autochanger including a plurality of slots each holding a roll paper and a switching mechanism that automatically switches a slot from which a roll paper to be supplied to the printer is drawn, the autochanger being configured to supply a roll paper drawn from any one of the plurality of slots to the printer as the continuous paper, the printing method including:

a print job registration step of registering a plurality of print jobs to be executed by the printer in a job list;

a scheduling step of creating a print schedule including a job execution schedule defining an execution order of the plurality of print jobs and a roll paper loading schedule defining a schedule for using a roll paper loaded in each of the plurality of slots and a schedule for loading a roll paper into each of the plurality of slots on a basis of a type and a remaining amount of roll paper loaded in each of the plurality of slots, a type of roll paper necessary for execution of each of the plurality of print jobs, and a print distance of each of the plurality of print jobs; and a possible loading time calculation step of obtaining, on a basis of the print schedule, a possible loading time that is a time at which a roll paper is loadable into a loading target slot being a slot into which a roll paper is to be loaded during execution of continuous printing based on the plurality of print jobs among the plurality of slots.

With such a configuration, in a printing system including an autochanger having a plurality of slots, in a case where it is necessary to load roll paper into a slot during execution of continuous printing, after creation of a job execution schedule defining an execution order of the plurality of print jobs and a roll paper loading schedule defining a schedule for using the roll paper loaded in each of the plurality of slots and a schedule for loading the roll paper into each of the plurality of slots, a possible loading time, at which the roll paper can be loaded into a loading target slot that is a slot into which the roll paper is to be loaded, is obtained. Thus, in a case where the operation of loading the roll paper is required, it is possible to present the time during which the operation is to be performed to the operator, and hence the operator can load the roll paper into the loading target slot quickly so that the printing operation is not stopped, by referring to the possible loading time. As above, in the printing system including the autochanger, it is possible to prevent a decrease in printing productivity due to switching of roll paper to be used for printing and loading of roll paper into a slot.

Another aspect of the present invention is directed to a printing system including:

a printer configured to perform printing on continuous paper;

an autochanger including a plurality of slots each holding a roll paper and a switching mechanism that automatically switches a slot from which a roll paper to be supplied to the printer is drawn, the autochanger being configured to supply a roll paper drawn from any one of the plurality of slots to the printer as the continuous paper;

a print job registration unit configured to register a plurality of print jobs to be executed by the printer in a job list;

a scheduling unit configured to create a print schedule including a job execution schedule defining an execution order of the plurality of print jobs and a roll paper loading schedule defining a schedule for using a roll paper loaded in each of the plurality of slots and a schedule for loading a roll paper into each of the plurality of slots on a basis of a type and a remaining amount of roll paper loaded in each of the plurality of slots, a type of roll paper necessary for execution of each of the plurality of print jobs, and a print distance of each of the plurality of print jobs; and a possible loading time calculation unit configured to obtain, on a basis of the print schedule, a possible loading time that is a time at which a roll paper is loadable into a loading target slot being a slot into which a roll paper is to be loaded during execution of continuous printing based on the plurality of print jobs among the plurality of slots.

Still another aspect of the present invention is directed to a non-transitory computer-readable recording medium recording a print control program executed in a printing system including a printer configured to perform printing on continuous paper, an autochanger including a plurality of slots each holding a roll paper and a switching mechanism that automatically switches a slot from which a roll paper to be supplied to the printer is drawn, and a print controller configured to control an operation of the printer and an operation of the autochanger, the autochanger being configured to supply a roll paper drawn from any one of the plurality of slots to the printer as the continuous paper, wherein the print control program causes a computer constituting the print controller to execute:

a print job registration step of registering a plurality of print jobs to be executed by the printer in a job list;

a scheduling step of creating a print schedule including a job execution schedule defining an execution order of the plurality of print jobs and a roll paper loading schedule defining a schedule for using a roll paper loaded in each of the plurality of slots and a schedule for loading a roll paper into each of the plurality of slots on a basis of a type and a remaining amount of roll paper loaded in each of the plurality of slots, a type of roll paper necessary for execution of each of the plurality of print jobs, and a print distance of each of the plurality of print jobs; and a possible loading time calculation step of obtaining, on a basis of the print schedule, a possible loading time that is a time at which a roll paper is loadable into a loading target slot being a slot into which a roll paper is to be loaded during execution of continuous printing based on the plurality of print jobs among the plurality of slots.

These and other objects, features, modes, and advantageous effects of the present invention will become more apparent from the following detailed description of the present invention with reference to the accompanying drawings.

BRIEF DESCRIPTION OF THE DRAWINGS

FIG. 10 is a diagram illustrating an example of a roll paper loading schedule displayed on an information display unit of the autochanger in the embodiment.

FIG. 15 is a diagram for describing the second case of the specific example concerning the scheduling processing in the embodiment.

FIG. 24 is a diagram for describing a fifth case of the specific example concerning the scheduling processing in the embodiment.

FIG. 25 is a diagram for describing the fifth case of the specific example concerning the scheduling processing in the embodiment.

DETAILED DESCRIPTION OF PREFERRED EMBODIMENTS

An embodiment of the present invention will be described below with reference to the accompanying drawings. In the present specification, a schedule for the printing order of a plurality of print jobs subject to continuous printing is referred to as a "job execution schedule", a schedule for using roll paper loaded in each slot and a schedule for loading roll paper into each slot are referred to as a "roll paper loading schedule", and a job execution schedule and a roll paper loading schedule are collectively referred to as a "print schedule". The type of roll paper may be abbreviated as a "roll type".

1. Configuration of Printing System

Figure 1:
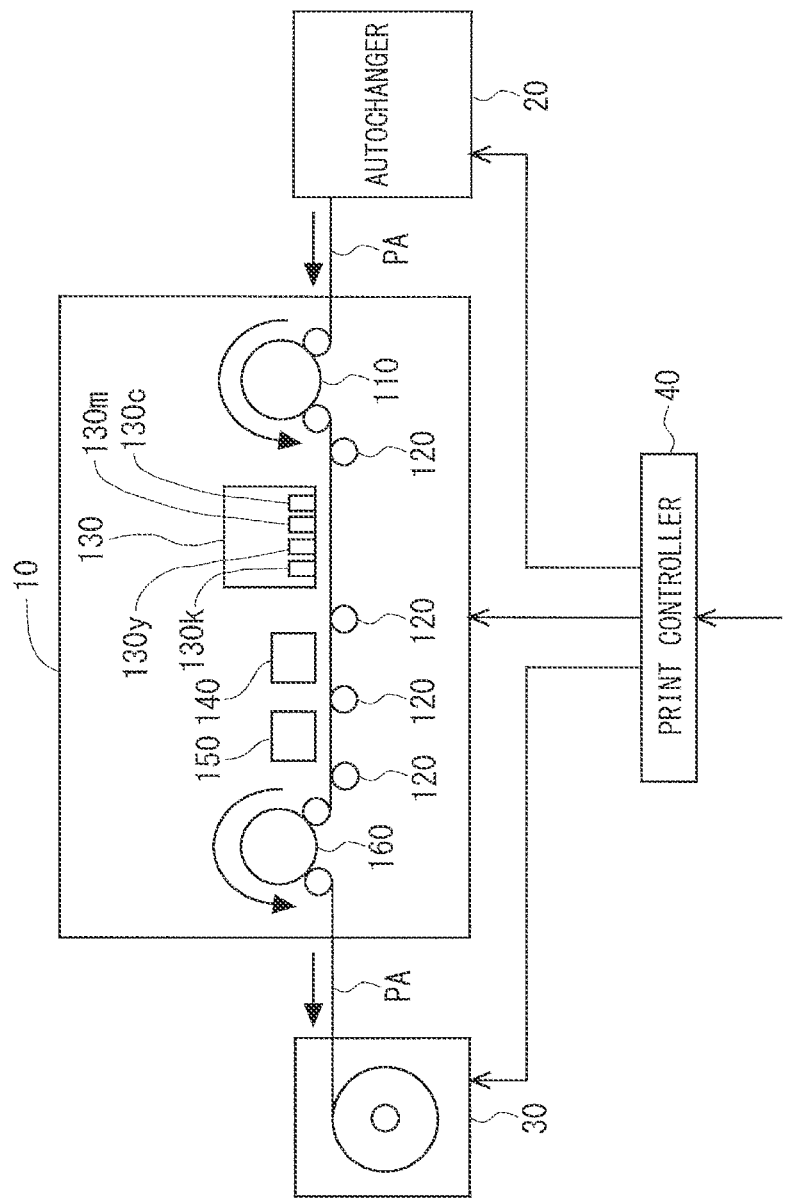
FIG. 1 is a configuration diagram of a printing system according to an embodiment of the present invention.

FIG. 1 is a configuration diagram of a printing system according to an embodiment of the present invention. The printing system includes a printer 10, an autochanger 20 including a plurality of slots each for holding roll paper, a paper winder 30 for winding printing paper PA after printing, and a print controller 40 for controlling the operations of the printer 10, the autochanger 20, and the paper winder 30. The printer 10 performs printing by discharging ink onto the printing paper PA without using a printing plate, and the autochanger 20 has an automatic switching function for roll paper to be used for printing. That is, this printing system achieves an inkjet printing apparatus with an automatic switching function for roll paper. The print controller 40 is provided with print job data (hereinafter referred to as "job data") via a communication line such as a local area network (LAN). Note that the autochanger 20 will be described later in detail.

As illustrated in FIG. 1, the printer 10 includes a first driving roller 110 for conveying the printing paper PA supplied from the autochanger 20 to the inside, a plurality of support rollers 120 for conveying the printing paper PA inside the printer 10, a printing unit 130 that performs printing by discharging ink onto the printing paper PA, a drying unit 140 that dries the printing paper PA after printing, an inspection unit 150 that inspects a state of printing on the printing paper PA, and a second driving roller 160 for outputting the printing paper PA from the inside of the printer 10.

The printing unit 130 includes a C inkjet head 130c, an M inkjet head 130m, a Y inkjet head 130y, and a K inkjet head 130k that discharge cyan (C), magenta (M), yellow (Y), and black (K) inks, respectively. Typically, each of the inkjet heads 130c, 130m, 130y, and 130k includes a plurality of head modules arranged in a staggered manner. Each head module has many nozzles.

In the above configuration, when an instruction to start printing is given to the print controller 40, the print controller 40 controls the operations of the autochanger 20, the printer 10, and the paper winder 30 so that the printing paper PA is supplied from the autochanger 20 to the printer 10 and the printing paper PA after printing is wound up by the paper winder 30. Then, in the process of conveying the printing paper PA, first, printing is performed by discharging the ink from each of the inkjet heads 130c, 130m, 130y, and 130k in the printing unit 130, next, the printing paper PA is dried by the drying unit 140, and finally, the printing state is inspected by the inspection unit 150.

Figure 3:
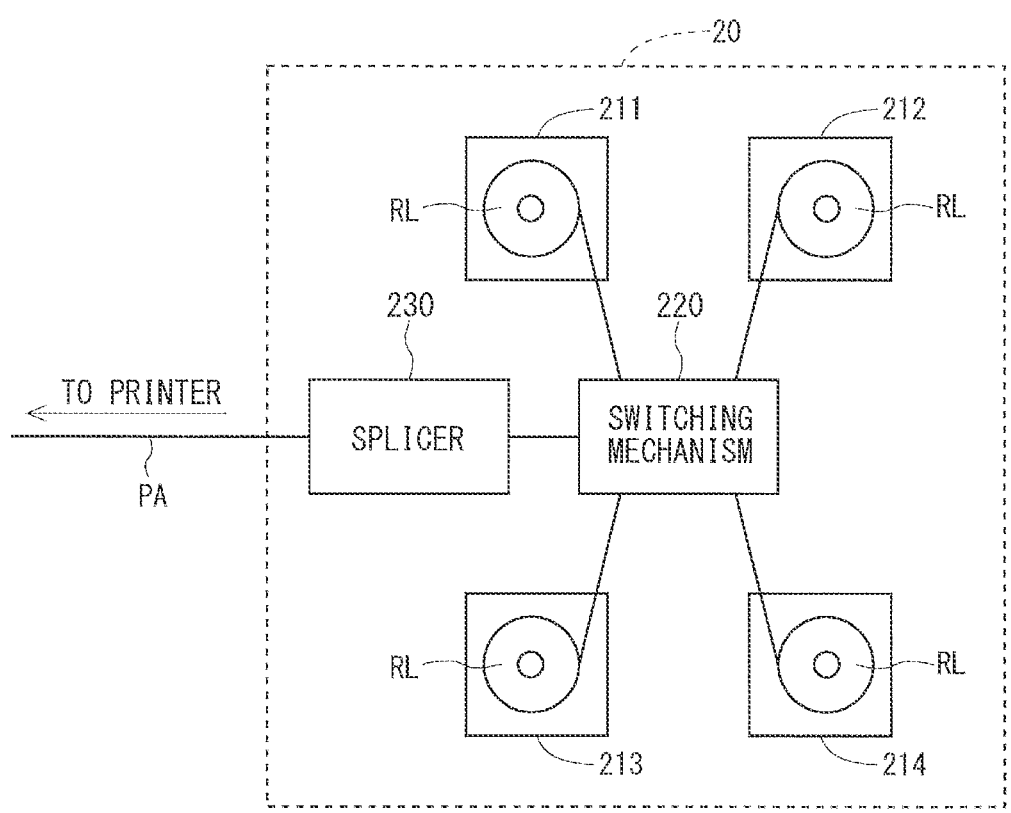
FIG. 3 is a diagram illustrating a schematic configuration of an autochanger according to the embodiment.

Although the configuration of the printer 10 for performing color printing has been exemplified here, the present invention can also be applied to a case where a printer for performing monochrome printing has been employed. Further, although the configuration of the printer 10 using aqueous ink has been exemplified here, the present invention can also be applied to a case where a printer using ultraviolet (UV) ink (ultraviolet curing ink), such as an inkjet printing apparatus for label printing, has been employed. In this case, an ultraviolet irradiation unit that cures UV ink on the printing paper PA by ultraviolet irradiation is provided inside the printer 10 (cf. FIG. 1) instead of the drying unit 140. Moreover, the present invention can also be applied to a case where a configuration in which the printer 10 is directly connected to a post-processing machine has been employed instead of the configuration in which the paper winder 30 is provided. Furthermore, the present invention can also be applied to a case where a configuration in which duplex printing is enabled by connecting two printers 10 via a reversing unit has been employed. In addition, the present invention can also be applied to a case where an autochanger similar to those illustrated in FIG. 3 is connected to the paper outputting end of the printer 10.

2. Hardware Configuration of Print Controller

Figure 2:
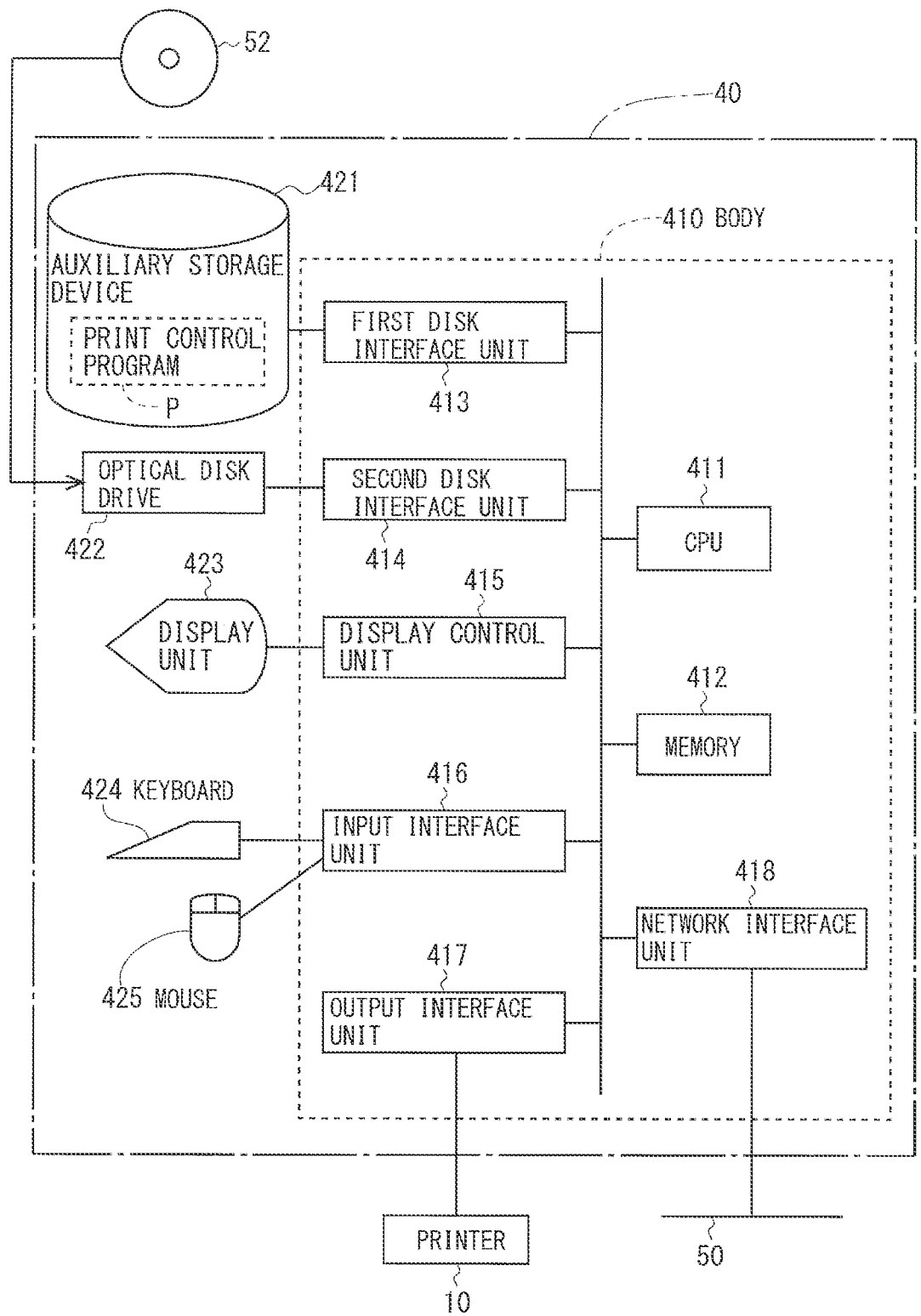
FIG. 2 is a block diagram illustrating a hardware configuration of a print controller according to the embodiment.

FIG. 2 is a block diagram illustrating a hardware configuration of the print controller 40. As illustrated in FIG. 2, the print controller 40 includes a body 410, an auxiliary storage device 421, an optical disk drive 422, a display unit 423, a keyboard 424, a mouse 425, and the like. The body 410 includes a central processing unit (CPU) 411, a memory 412, a first disk interface unit 413, a second disk interface unit 414, a display control unit 415, an input interface unit 416, an output interface unit 417, and a network interface unit 418. The CPU 411, the memory 412, the first disk interface unit 413, the second disk interface unit 414, the display control unit 415, the input interface unit 416, the output interface unit 417, and the network interface unit 418 are connected to each other via a system bus. The auxiliary storage device 421 is connected to the first disk interface unit 413. The optical disk drive 422 is connected to the second disk interface unit 414. The display unit (display device) 423 is connected to the display control unit 415. The keyboard 424 and the mouse 425 are connected to the input interface unit 416. The printer 10 is connected to the output interface unit 417 via a communication cable. A communication line 50 is connected to the network interface unit 418. The auxiliary storage device 421 is a magnetic disk device or the like. An optical disk 52 as a computer-readable recording medium such as a compact disk read-only memory (CD-ROM) or a digital versatile disk (DVD)-ROM is inserted into the optical disk drive 422. The display unit 423 is a liquid crystal display or the like. The display unit 423 is used to display information desired by an operator. The keyboard 424 and the mouse 425 are used by an operator to input instructions to the print controller 40.

The auxiliary storage device 421 stores a print control program P. In the present embodiment, the print control program P includes a subprogram that creates a print schedule so that efficient printing is performed utilizing the function of the autochanger 20. The CPU 411 reads the print control program P stored in the auxiliary storage device 421 into the memory 412 and executes the program to achieve various functions of the print controller 40. The memory 412 includes a random-access memory (RAM) and a read-only memory (ROM). The memory 412 functions as a work area for the CPU 411 to execute the print control program P stored in the auxiliary storage device 421. Note that the print control program P is provided by being stored into the computer-readable recording medium (non-transitory recording medium). That is, for example, a user purchases the optical disk 52 as a recording medium of the print control program P, inserts the optical disk 52 into the optical disk drive 422, reads the print control program P from the optical disk 52, and installs the print control program P in the auxiliary storage device 421. Alternatively, the print control program P transmitted via the communication line 50 may be received by the network interface unit 418 and installed in the auxiliary storage device 421.

3. Configuration of Autochanger

FIG. 3 is a diagram illustrating a schematic configuration of the autochanger 20. As illustrated in FIG. 3, the autochanger 20 according to the present embodiment includes four slots (first slot 211, second slot 212, third slot 213, and fourth slot 214) each for holding the roll paper RL, a switching mechanism 220 that automatically switches the roll paper RL to be used for printing (i.e., automatically switches the slot from which the roll paper RL to be supplied to the printer 10 is drawn), and a splicer 230 that joins the terminal end of the roll paper RL in use and the starting end of the roll paper RL to be used next (i.e., the starting end of the roll paper RL held in the slot selected by the switching mechanism 220) using an adhesive tape or the like. As above, the autochanger 20 supplies the roll paper drawn out from one of the four slots to the printer 10 as continuous paper. In a case where the roll paper RL to be used is switched when the remaining amount of the roll paper in use is not 0, the roll paper in use is cut, and the terminal end of the roll paper RL in use after cutting and the starting end of the roll paper RL to be used next are joined by the splicer 230.

The printing system according to the present embodiment is provided with the autochanger 20 having the configuration as described above, so that the roll paper RL to be used can be switched without stopping the conveyance of the printing paper PA. Note that the physical structure of the autochanger 20 is not directly related to the present invention, and hence its description and illustration are omitted.

4. Functional Configuration Related to Creation of Print Schedule

Figure 4:
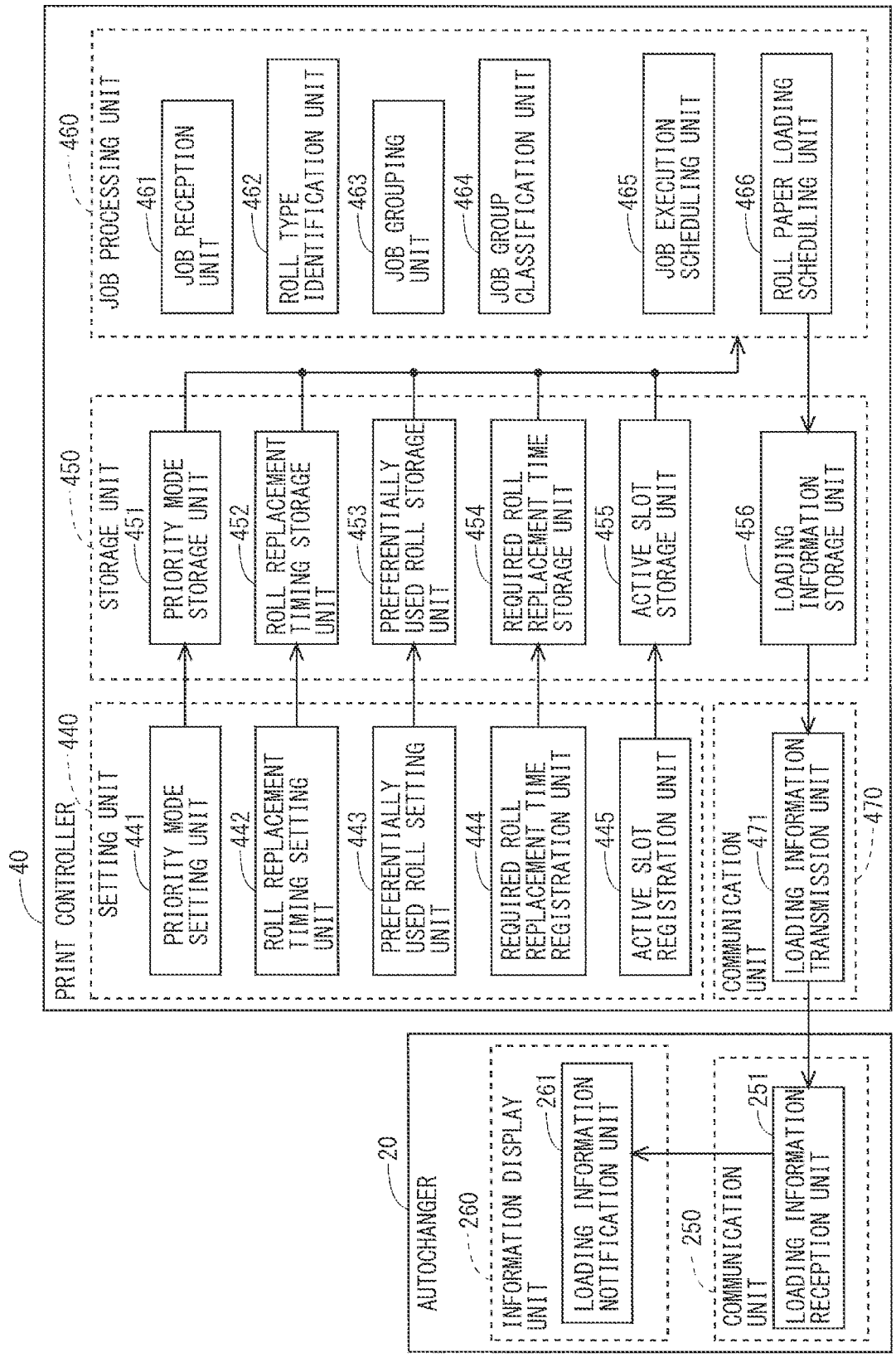
FIG. 4 is a block diagram illustrating a functional configuration related to the creation of a print schedule in the embodiment.

As described above, the print control program P includes a subprogram for creating a print schedule. FIG. 4 is a block diagram illustrating a functional configuration achieved by executing the subprogram (i.e., a functional configuration related to the creation of a print schedule). Note that, the components in the autochanger 20 are achieved by a computer provided in the autochanger 20 executing a predetermined program.

The print controller 40 includes a setting unit 440, a storage unit 450, a job processing unit 460, and a communication unit 470. The setting unit 440 includes a priority mode setting unit 441, a roll replacement timing setting unit 442, a preferentially used roll setting unit 443, a required roll replacement time registration unit 444, and an active slot registration unit 445. The storage unit 450 includes a priority mode storage unit 451, a roll replacement timing storage unit 452, a preferentially used roll storage unit 453, a required roll replacement time storage unit 454, an active slot storage unit 455, and a loading information storage unit 456. The job processing unit 460 includes a job reception unit 461, a roll type identification unit 462, a job grouping unit 463, a job group classification unit 464, a job execution scheduling unit 465, and a roll paper loading scheduling unit 466. The communication unit 470 includes a loading information transmission unit 471.

The priority mode setting unit 441 sets a priority mode at the time of performing scheduling (the creation of a print schedule) on the basis of the operation of the operator. In the present embodiment, a job list registration order mode for executing printing in the order of print jobs registered in a job list (information of a plurality of print jobs subject to continuous printing, which is held in a list format so that the information can be referred to), a production time reduction mode for prioritizing a reduction in time required for executing continuous printing based on the plurality of print jobs registered in the job list, and a roll specification order mode for executing printing in a specified "order of roll types" are prepared, and the priority mode setting unit 441 sets any one of the three modes as the priority mode. At the time of setting the roll specification order mode to the priority mode, the order of roll types is also specified. The information on the priority mode set by the priority mode setting unit 441 is stored into the priority mode storage unit 451.

The roll replacement timing setting unit 442 sets whether to replace the roll paper at an early timing after the start of the continuous printing based on the plurality of print jobs or to replace the roll paper at a later timing from the start of the continuous printing based on the plurality of print jobs in a case where the roll paper replacement is necessary, on the basis of the operation of the operator. The matter set by the roll replacement timing setting unit 442 is stored into the roll replacement timing storage unit 452.

The preferentially used roll setting unit 443 sets whether to preferentially use roll paper with a large remaining amount or to preferentially use roll paper with a small remaining amount in a case where the same type of roll papers are held in plural slots, on the basis of the operation of the operator. The matter set by the preferentially used roll setting unit 443 is stored into the preferentially used roll storage unit 453.

The required roll replacement time registration unit 444 registers a time per slot required for replacement of the roll paper by the operator (hereinafter referred to as "required roll replacement time") on the basis of the operation of the operator. The information on the required roll replacement time registered by the required roll replacement time registration unit 444 is stored into the required roll replacement time storage unit 454.

The active slot registration unit 445 registers available slots (active slots) among the four slots (first slot 211, second slot 212, third slot 213, and fourth slot 214) provided in the autochanger 20 on the basis of the operation of the operator. The information on the active slots registered by the active slot registration unit 445 is stored into the active slot storage unit 455.

The job reception unit 461 receives job data provided to the print controller 40 via the communication line 50. The job data includes, in addition to image data to be printed, information on the type of roll paper necessary for executing the corresponding print job, and the like.

The roll type identification unit 462 identifies a roll type necessary for execution of each print job on the basis of the job data received by the job reception unit 461.

The job grouping unit 463 groups a plurality of print jobs registered in a job list. Note that this grouping is performed using the roll type as a key. Hereinafter, a set of plural print jobs associated with the same roll type is referred to as a "job group". For example, in a case where four types of roll paper are used by executing a plurality of print jobs registered in a job list, grouping into four job groups is performed for the plurality of print jobs.

The job group classification unit 464 classifies job groups obtained by the grouping by the job grouping unit 463 into an executable job group and an inexecutable job group. The executable job group is a job group including only print jobs enabling the completion of printing using one or more roll papers loaded in the active slots. The inexecutable job group is a job group including print jobs not enabling the completion of printing in a case in which only one or more roll papers loaded in the active slots are used. For example, it is assumed that one job group is made up of two print jobs (job J1 and job J2) associated with a roll type of "type TA", and the total print distance of the two print jobs is 1,000 m. At this time, when the roll paper of Type TA is loaded in only one slot, and the remaining amount (remaining distance) of the roll paper is 2,000 m, the job group is classified as an executable job group. On the other hand, when the roll paper of Type TA is loaded in only one slot, and the remaining amount of the roll paper is 500 m, the job group is classified as an inexecutable job group. As thus described, the job group is classified by the job group classification unit 464 in consideration of the remaining amount of roll paper loaded in each active slot and the total print distance for each roll type.

The information stored in the priority mode storage unit 451, the roll replacement timing storage unit 452, the preferentially used roll storage unit 453, the required roll replacement time storage unit 454, and the active slot storage unit 455 (hereinafter referred to as "scheduling condition information") is referred to by the job execution scheduling unit 465 and the roll paper loading scheduling unit 466.

The job execution scheduling unit 465 determines printing order for the plurality of print jobs registered in the job list (i.e., creates a job execution schedule) on the basis of the scheduling condition information.

The roll paper loading scheduling unit 466 creates a roll paper loading schedule that is a schedule for using a roll paper loaded in each slot and a schedule for loading a roll paper into each slot on the basis of the scheduling condition information. At that time, regarding a case where the loading of the roll paper into the slot is required when the printing is executed in the order based on the job execution schedule created by the job execution scheduling unit 465, the roll paper loading scheduling unit 466 obtains a time at which the loading of the roll paper into a loading target slot (a slot to which the roll paper is loaded) can be started (hereinafter referred to as a "possible loading start time") and a time indicating when the loading of the roll paper into the loading target slot is to be started at the latest in order not to stop the printing operation (hereinafter referred to as a "loading start deadline time"). The information on the possible loading start time and the loading start deadline time obtained by the roll paper loading scheduling unit 466 is stored into the loading information storage unit 456.

The loading information transmission unit 471 transmits the information on the possible loading start time and the loading start deadline time (hereinafter referred to as "loading information") stored in the loading information storage unit 456 to the autochanger 20.

The autochanger 20 includes a communication unit 250 and an information display unit 260. The communication unit 250 includes a loading information reception unit 251. The information display unit 260 includes a loading information notification unit 261. The loading information reception unit 251 receives the loading information transmitted from the loading information transmission unit 471. The loading information is provided to the loading information notification unit 261. The loading information notification unit 261 notifies the outside of the loading information.

5. Creation of Print Schedule

Next, how the print schedule (job execution schedule and roll paper loading schedule) is created in the present embodiment will be described. Hereinafter, the roll paper to be loaded into the slot is referred to as "loading target roll paper".

5.1 Procedure for Scheduling Processing

A procedure for scheduling processing (a series of processing related to the creation of a print schedule) will be described with reference to a flowchart illustrated in FIG. 5. Note that this scheduling processing is achieved by the subprogram included in the print control program P. That is, this scheduling processing is processing performed by the print controller 40.

After the scheduling processing is started, initial processing is performed (step S100). The initial processing will be described with reference to the flowchart illustrated in FIG. 6.

In the initial processing, first, various conditions related to the operation of the autochanger 20 are set (step S101), specifically as follows. The priority mode setting unit 441 sets a mode to be employed as the priority mode (any one of the job list registration order mode, the production time reduction mode, and the roll specification order mode is set as the priority mode). The roll replacement timing setting unit 442 sets whether to replace the roll paper at an early timing after the start of the continuous printing based on the plurality of print jobs or to replace the roll paper at a later timing from the start of the continuous printing based on the plurality of print jobs in a case where the roll paper replacement is necessary. The preferentially used roll setting unit 443 sets whether to preferentially use roll paper with a large remaining amount or to preferentially use roll paper with a small remaining amount. The required roll replacement time registration unit 444 registers the required roll replacement time. The active slot registration unit 445 registers active slots.

Next, on the basis of the job data received by the job reception unit 461, a print job (to execute the continuous printing from now on) is registered in the job list (step S102). Here, it is assumed that a plurality of print jobs are registered. Note that the roll type identification unit 462 identifies the roll type associated with each print job.

Next, information on the type of roll paper loaded in each active slot of the autochanger 20 is acquired (step S103). When the active slot is not loaded with roll paper, information indicating that the active slot is an empty slot is acquired. Next, the job grouping unit 463 groups the plurality of print jobs registered in step S102 (i.e., the plurality of print jobs registered in the job list) using the roll type as a key (step S104). Next, the job group classification unit 464 classifies the job groups obtained by the grouping in step S104 into the executable job group described above and the inexecutable job group described above (step S105). Thereby, the initial processing ends.

After the end of the initial processing, it is determined whether or not a first determination condition that "continuous printing based on a plurality of print jobs registered in a job list can be executed without requiring loading of roll paper into a slot or replacement of roll paper loaded in the slot during execution of printing" is satisfied (step S110). In the determination in step S110, the result of the classification in step S105 is referred to. When all the job groups are classified as executable job groups, it is determined that the first determination condition is satisfied. In addition, even when there is a job group classified as an inexecutable job group, it is determined that the first determination condition is satisfied in a case where the continuous printing based on the plurality of print jobs registered in the job list is enabled by loading roll paper into an empty slot before the start of printing or by replacing roll paper in a slot loaded with roll paper that is not scheduled to be used before the start of printing. When it is necessary to load or replace the roll paper during execution of printing, it is determined that the first determination condition is not satisfied. When it is determined in step S110 that the first determination condition is satisfied, the processing proceeds to step S112, and when it is determined in step S110 that the first determination condition is not satisfied, the processing proceeds to step S120.

In step S112, the printing order for the plurality of print jobs registered in the job list is determined according to the priority mode set in step S101. When the priority mode is the job list registration order mode, the printing order is determined according to the order of print jobs registered in the job list. When the priority mode is the production time reduction mode, the printing order is determined so that the time required to execute the continuous printing based on the plurality of print jobs becomes the shortest (typically, the printing order is determined so that the number of times of roll paper splicing is minimized). When the priority mode is the roll specification order mode, the printing order is determined so that the continuous printing is executed in the specified "order of roll types". After the end of step S112, the processing proceeds to step S190.

In step S120, it is determined whether or not a second determination condition that "the priority mode set in step S101 is the job list registration order mode" is satisfied. As a result, when the second determination condition is satisfied, the processing proceeds to step S122, and when the second determination condition is not satisfied, the processing proceeds to step S130.

In step S122, the printing order is determined according to the order of the print jobs registered in the job list. The loading target slot corresponding to each loading target roll paper is identified in consideration of the determined printing order and the setting as to whether to preferentially use roll paper with a large remaining amount or to preferentially use roll paper with a small remaining amount (this setting was made in step S101 of FIG. 6). After the end of step S122, the processing proceeds to step S190.

In step S130, information of the roll type necessary for executing the print job constituting the job group classified as the inexecutable job group in step S105 (i.e., information of the roll type associated with the print job constituting the job group classified as the inexecutable job group) is acquired.

In step S140, it is determined whether or not a third determination condition that "the priority mode set in step S101 is the production time reduction mode" is satisfied. As a result, when the third determination condition is satisfied, the processing proceeds to step S150, and when the third determination condition is not satisfied, the processing proceeds to step S160. That is, when the priority mode is the production time reduction mode, the processing proceeds to step S150, and when the priority mode is the roll specification order mode, the processing proceeds to step S160.

In step S150, it is determined whether or not a fourth determination condition that "a setting of 'replacing the roll paper at an early timing after the start of the continuous printing based on the plurality of print jobs in a case where the roll paper replacement is necessary' was made in step S101" is satisfied. As a result, when the fourth determination condition is satisfied, the processing proceeds to step S152, and when the fourth determination condition is not satisfied, the processing proceeds to step S154.

In step S152, the printing order of the plurality of print jobs is determined so that the print job constituting the job group classified as the inexecutable job group is later in the order, and the print job associated with the roll type having a shorter total print distance is earlier in the order. Similarly to step S122, the loading target slot corresponding to each loading target roll paper is identified. After the end of step S152, the processing proceeds to step S170.

In step S154, the printing order of the plurality of print jobs is determined so that the print job constituting the job group classified as the executable job group is earlier in the order, and the print job associated with the roll type having a longer total print distance is earlier in the order. Similarly to step S122, the loading target slot corresponding to each loading target roll paper is identified. After the end of step S154, the processing proceeds to step S170.

In step S160, it is determined whether or not the fourth determination condition described above is satisfied. As a result, when the fourth determination condition is satisfied, the processing proceeds to step S162, and when the fourth determination condition is not satisfied, the processing proceeds to step S164.

In step S162, the printing order for the plurality of print jobs is determined so that printing is executed in the "order of roll types" specified in step S101. On the basis of the determined printing order, the loading target slot corresponding to each loading target roll paper is identified on the assumption that the roll paper is loaded into the slot at the timing as early as possible from the printing start time point. After the end of step S162, the processing proceeds to step S170.

In step S164, the printing order for the plurality of print jobs is determined so that printing is executed in the "order of roll types" specified in step S101. In addition, on the basis of the determined printing order, the loading target slot corresponding to each loading target roll paper is identified on the assumption that the roll paper is loaded into the slot at the timing as late as possible from the printing start time point. After the end of step S164, the processing proceeds to step S170.

In step S170, the possible loading start time is obtained for each loading target roll paper on the basis of the printing order and the loading target slot determined in any one of steps S122, S152, S154, S162, and S164.

In step S180, the loading start deadline time is obtained for each loading target roll paper on the basis of the printing order referred to in step S170 and the required roll replacement time set in step S101. Specifically, a time earlier by the required roll replacement time than the scheduled time at which printing on the roll paper after the replacement is started is obtained as the loading start deadline time. Note that a period from the possible loading start time to the loading start deadline time corresponds to a possible loading time (a time at which roll paper can be loaded into the loading target slot).

In step S190, the entire print schedule (the printing order for the plurality of print jobs registered in the job list, the printing start time and the print end time for each print job, the association between the print job and the slot, the possible loading start time and the loading start deadline time for each loading target roll paper, etc.) is fixed.

Thereafter, in step S200, the loading information is transmitted from the print controller 40 to the autochanger 20, and the loading information is displayed on the information display unit 260 of the autochanger 20. Thereby, the scheduling processing ends. Note that, in step S200, for example, the loading information may be transmitted to an information transmission destination, such as a mail address specified in advance, by e-mail or the like. Further, when the possible loading start time is reached during the period in which the continuous printing is executed according to the print schedule fixed in step S190, a notification that the roll paper is to be loaded into the slot may be transmitted to an information transmission destination, such as a mail address specified in advance, by e-mail or the like.

Meanwhile, in steps S122, S152, S154, S162, and S164, the job execution schedule and the roll paper loading schedule are created on the basis of the type and the remaining amount of the roll paper loaded in each of the plurality of slots constituting the autochanger 20, the type of the roll paper required to execute each of the plurality of print jobs subject to continuous printing, and the print distance of each of the plurality of print jobs.

In the present embodiment, a priority mode setting step, a required roll replacement time registration step, and a roll replacement timing setting step are achieved by step S101, a print job registration step is achieved by step S102, a job grouping step is achieved by step S104, a job group classification step is achieved by step S105, a scheduling step is achieved by step S112, step S122, step S152, step S154, step S162, and step S164, a possible loading time calculation step is achieved by step S170 and step S180, a possible loading start time calculation step is achieved by step S170, a loading start deadline time calculation step is achieved by step S180, and a loading information notification step is achieved by step S200.

5.2 Detailed Specific Example of Scheduling Processing

Next, a detailed specific example of the scheduling processing will be described. In the present specific example, situations described in the following (a) to (i) are assumed.

(a) The printing speed is "100 m/min".

(b) All of the four slots (first slot 211, second slot 212, third slot 213, and fourth slot 214) provided in the autochanger 20 are registered as active slots.

Figures 6, 7:
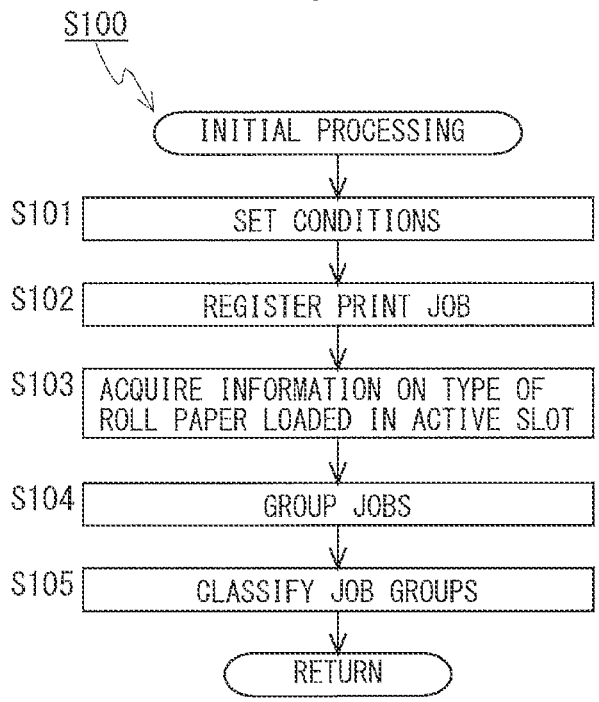
FIG. 6 is a flowchart illustrating a procedure for initial processing included in the scheduling processing in the embodiment.
FIG. 7 is a diagram for describing a detailed specific example of the scheduling processing in the embodiment.

(c) Eight print jobs (jobs J1 to J8) are registered in the job list as illustrated in FIG. 7.

Figures 8, 9:
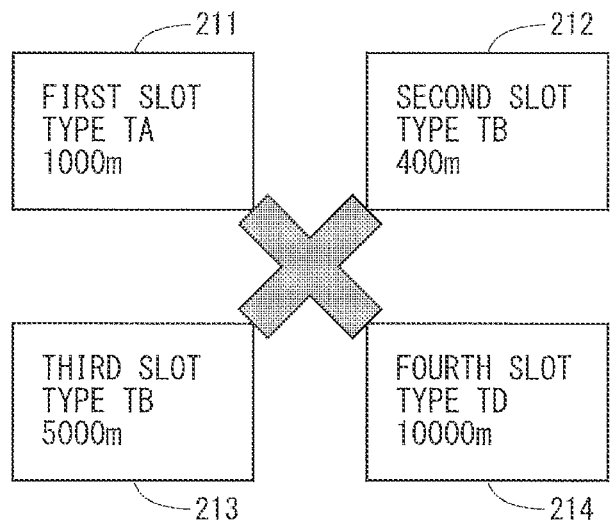
FIG. 8 is a diagram for describing a detailed specific example of the scheduling processing in the embodiment.
FIG. 9 is a diagram for describing a detailed specific example of the scheduling processing in the embodiment.

(d) In the initial state, as illustrated in FIG. 8, the first slot 211 is loaded with roll paper of Type TA with a remaining amount of 1,000 m, the second slot 212 is loaded with roll paper of Type TB with a remaining amount of 400 m, the third slot 213 is loaded with roll paper of Type TB with a remaining amount of 5,000 m, and the fourth slot 214 is loaded with roll paper of Type TD with a remaining amount of 10,000 m. Note that the serial number of the roll paper loaded in the first slot 211 is A123, the serial number of the roll paper loaded in the second slot 212 is B456, the serial number of the roll paper loaded in the third slot 213 is B987, and the serial number of the roll paper loaded in the fourth slot 214 is D357.

(e) The priority mode has been set to the roll specification order mode, and the specified "order of roll types" is "Type TB, Type TD, Type TA, and Type TC".

(f) The setting of "preferentially using roll paper with a small remaining amount" has been made.

(g) The setting of "replacing the roll paper at an early timing after the start of the continuous printing based on the plurality of print jobs in a case where the roll paper replacement is necessary" has been made.

(h) The required roll replacement time is 5 minutes.

(i) The printing start time is 10:00.

In step S104 of FIG. 6, eight print jobs (jobs J1 to J8) registered in the job list are grouped into four job groups. Here, for convenience, a job group made up of the print jobs (Jobs J3, J4, and J8) associated with the roll type "Type TA" is referred to as a "job group JGA", a job group made up of the print jobs (Jobs J5 and J7) associated with the roll type "Type TB" is referred to as a "job group JGB", a job group made up of the print job (job J6) associated with the roll type "Type TC" is referred to as a "job group JGC", and a job group made up of the print jobs (Jobs J1 and J2) associated with the roll type "Type TD" is referred to as a "job group JGD".

The total print distance for the job group JGA is 3,300 m, and the remaining amount of the roll paper of Type TA loaded in the active slot is 1,000 m. It is thus necessary to load the roll paper of Type TA into the active slot. The total print distance for the job group JGB is 900 m, and the remaining amount of the roll paper of Type TB loaded in the active slot is 5,400 m. Thus, it is not necessary to load the roll paper of Type TB into the active slot. The total print distance for the job group JGC is 1,200 m, and there is no roll paper of Type TC loaded in the active slot. It is thus necessary to load the roll paper of Type TC into the active slot. The total print distance for the job group JGD is 3,200 m, and the remaining amount of the roll paper of Type TD loaded in the active slot is 10,000 m. Thus, it is not necessary to load the roll paper of Type TD into the active slot. From the above, in step S105 of FIG. 6, the job group JGA and the job group JGC are classified as the inexecutable job groups, and the job group JGB and the job group JGD are classified as the executable job groups.

There is an inexecutable job group, and roll paper needs to be loaded during printing. Thus, in step S110 of FIG. 5, it is determined that the first determination condition is not satisfied. Further, since the priority mode is the roll specification order mode, it is determined that the second determination condition is not satisfied in step S120 of FIG. 5, and it is determined that the third determination condition is not satisfied in step S140 of FIG. 5. The setting of "replacing the roll paper at an early timing after the start of the continuous printing based on the plurality of print jobs in a case where the roll paper replacement is necessary" has been made, so that it is determined in step S160 of FIG. 5 that the fourth determination condition is satisfied.

Figure 5:
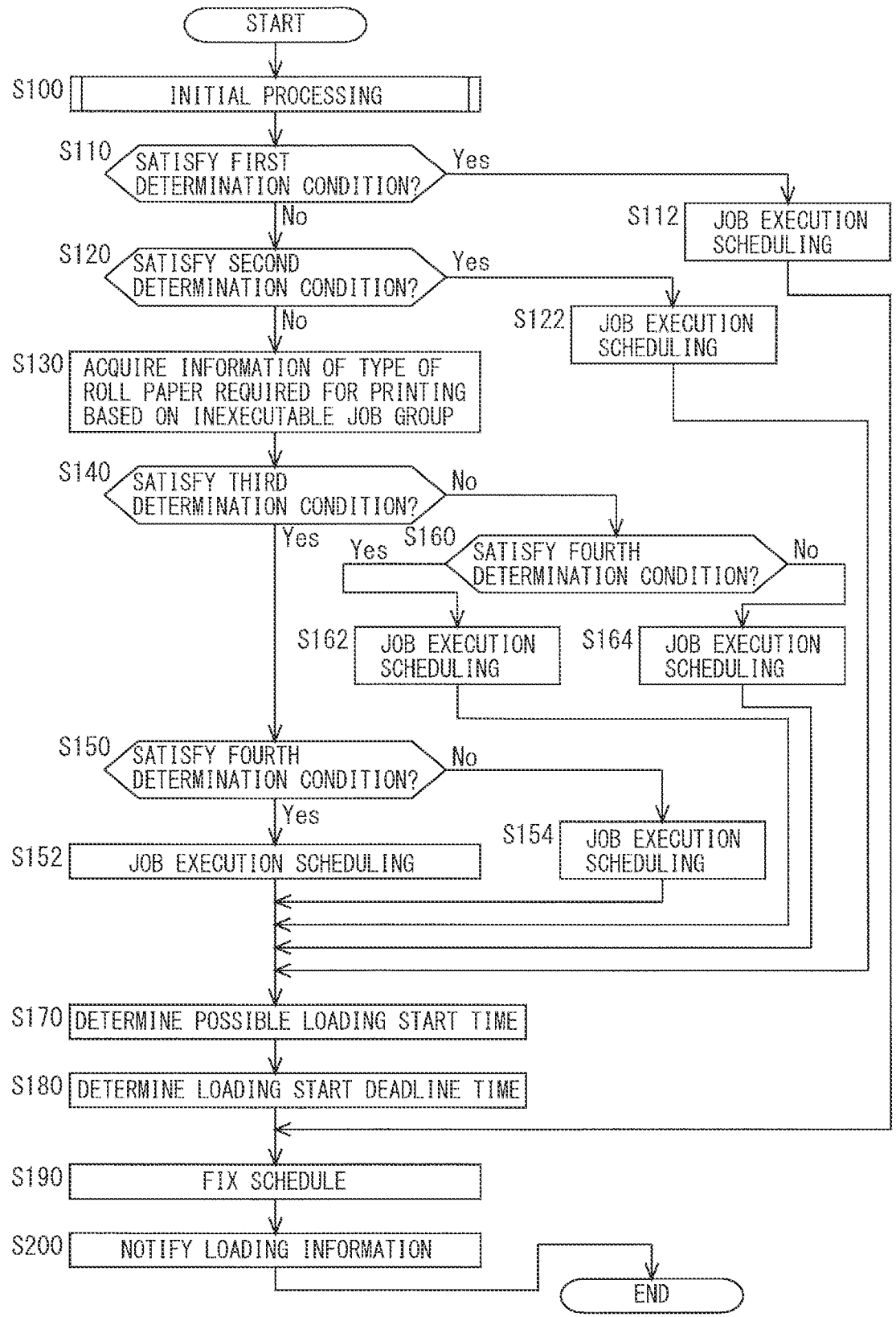
FIG. 5 is a flowchart illustrating a procedure for scheduling processing (a series of processing related to the creation of a print schedule) in the embodiment.

The specified "order of roll types" is "Type TB, Type TD, Type TA, and Type TC", and hence the printing order is determined in step S162 of FIG. 5 as illustrated in FIG. 9. Therefore, hereinafter, the job group JGB is referred to as a "first print job group", the job group JGD is referred to as a "second print job group", the job group JGA is referred to as a "third print job group", and the job group JGC is referred to as a "fourth print job group".

For job J5, the print distance is 400 m, and the print time is 4 minutes. The remaining amount of the roll paper of Type TB loaded in the second slot 212 is 400 m. The printing start time is 10:00. From the above, in step S170 of FIG. 5, the possible loading start time is determined to be 10:04 for the loading of the roll paper of Type TA necessary for executing the third print job group into the loading target slot (second slot 212).

Note that, when the setting of "replacing the roll paper at later timing from the start of the continuous printing based on the plurality of print jobs in a case where the roll paper replacement is necessary" has been made, a roll paper loading schedule for loading the roll paper of Type TA into the fourth slot 214 after the end of printing based on the second print job group is created. At this time, in step S170 of FIG. 5, the possible loading start time is determined to be 10:41, which is a time at which printing based on the second print job group ends.

The first slot 211 is loaded with the roll paper of Type TA with a remaining amount of 1,000 m. The print distance of job J4 is 1,600 m. The printing speed is "100 m/min". From the above, the remaining amount of the roll paper loaded in the first slot 211 becomes 0 ten minutes after the start of the execution of the job J4. That is, at 10:51, the remaining amount of the roll paper loaded in the first slot 211 becomes 0. The required roll replacement time is five minutes. Thus, in step S180 of FIG. 5, the loading start deadline time is determined to be 10:46 for the loading of the roll paper of Type TA necessary for executing the third print job group into the loading target slot (second slot 212).

For job J7, the print distance is 500 m, and the print time is 5 minutes. Although the remaining amount of the roll paper of Type TB loaded in the third slot 213 is 5,000 m, the roll paper of Type TB is not used for printing after the end of the printing based on the job J7. Thus, the third slot 213 can be used as the loading target slot for the roll paper of Type TC necessary for executing the fourth print job group. From the above, in step S170 of FIG. 5, the possible loading start time is determined to be 10:09 for the loading of the roll paper of Type TC necessary for executing the fourth print job group into the loading target slot (the third slot 213).

Note that, when the setting of "replacing the roll paper at a later timing from the start of the continuous printing based on the plurality of print jobs in a case where the roll paper replacement is necessary" has been made, a roll paper loading schedule for loading the roll paper of Type TC into the first slot 211 after the remaining amount of the roll paper of Type TA loaded in the first slot 211 becomes 0 is created. At that time, in step S170 of FIG. 5, the possible loading start time is determined to be 10:51, which is a time at which the remaining amount of the roll paper loaded in the first slot 211 becomes 0.

It takes one hour and 14 minutes to execute the first print job group, the second print job group, and the third print job group. The required roll replacement time is five minutes. Thus, in step S180 of FIG. 5, the loading start deadline time is determined to be 11:09 for the loading of the roll paper of Type TC necessary for executing the fourth print job group into the loading target slot (the third slot 213).

As described above, for the loading of the roll paper of Type TA into the second slot 212, the possible loading start time is determined to be 10:04 and the loading start deadline time is determined to be 10:46. For the loading of the roll paper of Type TC into the third slot 213, the possible loading start time is determined to be 10:09 and the loading start deadline time is determined to be 11:09. On the basis of these, in step S200 of FIG. 5, for example, a roll paper loading schedule as illustrated in FIG. 10 is displayed on the information display unit 260 of the autochanger 20. The "possible loading start time" column shows a time at which the new roll paper can be loaded into each slot. The "possible loading time length" column shows a time length from the possible loading start time to the loading start deadline time.

5.3 Various Specific Examples

Hereinafter, various specific examples related to the scheduling processing will be described. Again, it is assumed that all of the four slots (first slot 211, second slot 212, third slot 213, and fourth slot 214) provided in the autochanger 20 are active slots.

5.3.1 First Case

Figures 11, 12:
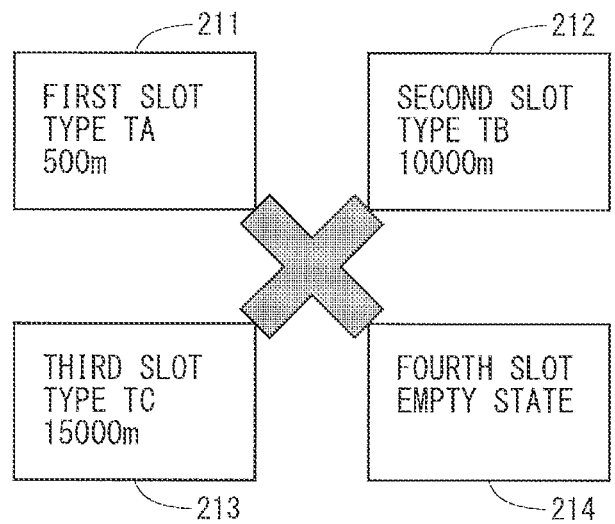
FIG. 11 is a diagram for describing a first case of a specific example concerning the scheduling processing in the embodiment.
FIG. 12 is a diagram for describing the first case of the specific example concerning the scheduling processing in the embodiment.

A first case is a case where creation of a job execution schedule (hereinafter referred to as "job execution scheduling") is performed in step S112 of FIG. 5. For the first case, the following situation is assumed. As illustrated in FIG. 11, four print jobs (jobs J1 to J4) are registered in the job list. The states of the first to fourth slots 211 to 214 in the initial state are as illustrated in FIG. 12. The priority mode has been set to the job list registration order mode.

Figure 13:
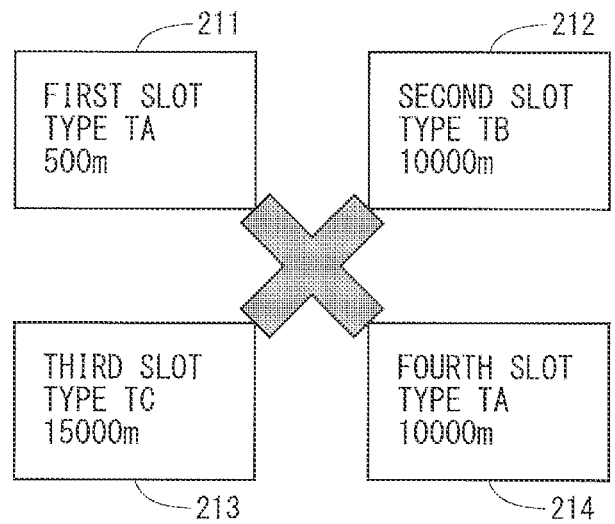
FIG. 13 is a diagram for describing the first case of the specific example concerning the scheduling processing in the embodiment.

In this case, only a job group including the print jobs (jobs J1 and J4) associated with the roll type "Type TA" is the inexecutable job group. In the initial state, the fourth slot 214 is an empty slot. When the roll paper of Type TA having a length of 2,500 m or more is loaded into the fourth slot 214 before the start of printing, it is not necessary to load the roll paper into the slot during execution of printing. Therefore, a roll paper loading schedule for loading the roll paper of Type TA into the fourth slot 214, which is an empty slot, before the start of printing is created. According to the roll paper loading schedule, the states of the first to fourth slots 211 to 214 at the printing start time point are, for example, the states illustrated in FIG. 13. Note that, since the priority mode is the job list registration order mode, the printing order determined by the scheduling processing is as illustrated in FIG. 11.

5.3.2 Second Case

Figure 14:
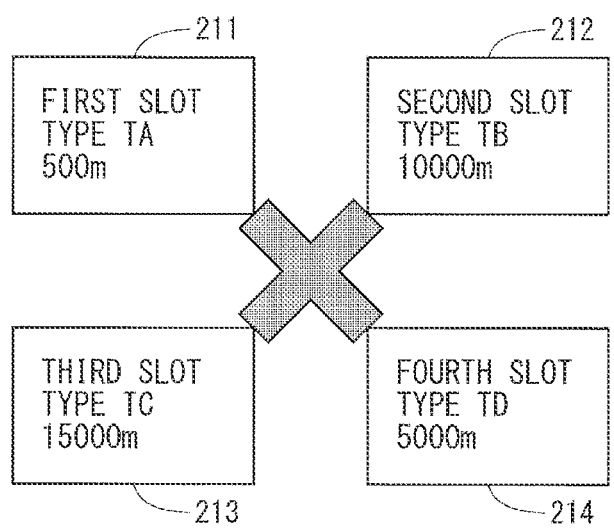
FIG. 14 is a diagram for describing a second case of the specific example concerning the scheduling processing in the embodiment.

A second case is also a case where the job execution scheduling is performed in step S112 of FIG. 5. For the second case, the following situation is assumed. As illustrated in FIG. 11, four print jobs (jobs J1 to J4) are registered in the job list. The states of the first to fourth slots 211 to 214 in the initial state are as illustrated in FIG. 14. The priority mode has been set to the production time reduction mode.

In this case, as in the first case, only a job group including the print jobs (jobs J1 and J4) associated with the roll type "Type TA" is the inexecutable job group. In the initial state, there is no empty slot, but the fourth slot 214 is loaded with the roll paper of Type TD that is not used for printing. When the roll paper loaded in the fourth slot 214 is replaced with the roll paper of Type TA having a length of 2,500 m or more before the start of printing, it is not necessary to load the roll paper into the slot during execution of printing. Therefore, a roll paper loading schedule for replacing the roll paper loaded in the fourth slot 214 with the roll paper of Type TA before the start of printing is created. According to the roll paper loading schedule, the states of the first to fourth slots 211 to 214 at the printing start time point are, for example, the states illustrated in FIG. 13. In addition, since the priority mode is the production time reduction mode, the printing order is determined so that the job J1 and the job J4 are executed in succession. Therefore, the printing order determined by the scheduling processing is as illustrated in FIG. 15.

5.3.3 Third Case

Figures 16, 17:
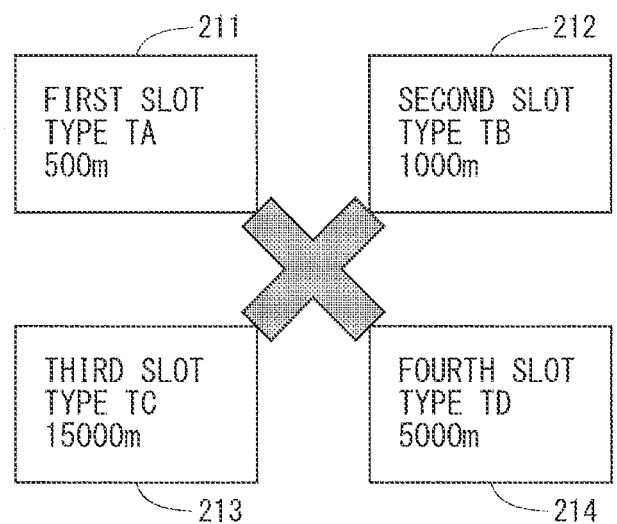
FIG. 16 is a diagram for describing a third case of the specific example concerning the scheduling processing in the embodiment.
FIG. 17 is a diagram for describing the third case of the specific example concerning the scheduling processing in the embodiment.

A third case is a case where the job execution scheduling is performed in step S122 of FIG. 5. For the third case, the following situation is assumed. As illustrated in FIG. 16, six print jobs (jobs J1 to J6) are registered in the job list. The states of the first to fourth slots 211 to 214 in the initial state are as illustrated in FIG. 17. The priority mode has been set to the job list registration order mode.

Figure 18:
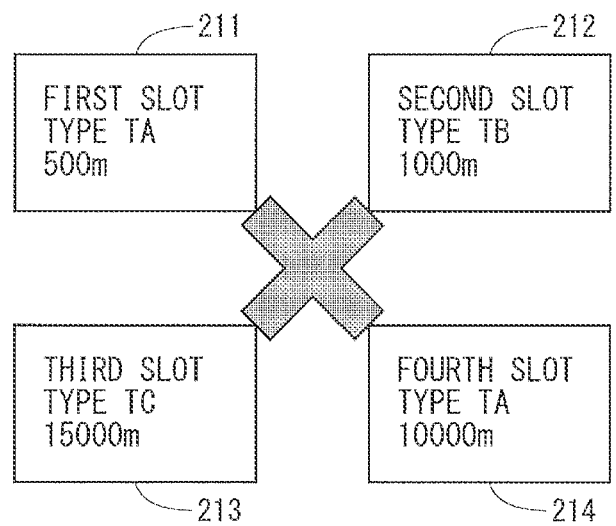
FIG. 18 is a diagram for describing the third case of the specific example concerning the scheduling processing in the embodiment.
Figure 19:
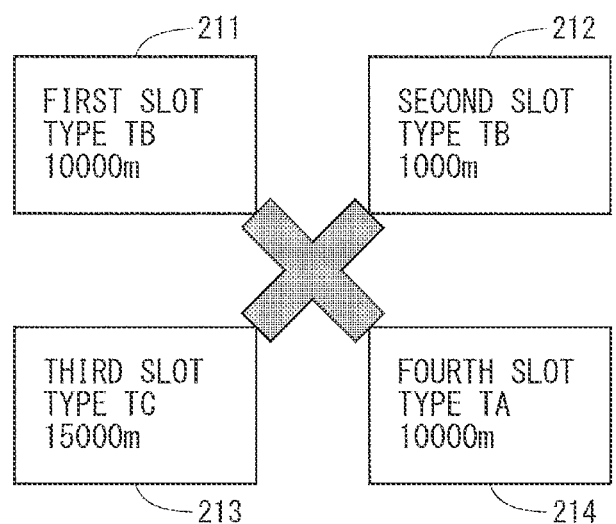
FIG. 19 is a diagram for describing the third case of the specific example concerning the scheduling processing in the embodiment.

In this case, a job group including the print jobs (Jobs J1 and J5) associated with the roll type "Type TA" and a job group including the print jobs (Jobs J2 and J6) associated with the roll type "Type TB" are the inexecutable job groups. In the initial state, there is neither an empty slot nor a slot loaded with a type of roll paper that is not used for printing. It is thus necessary to load the roll paper of Type TA and the roll paper of Type TB into the slot during execution of printing. Since the priority mode is the job list registration order mode, the printing order determined by the scheduling processing is as illustrated in FIG. 16. The total print distance of the two print jobs (jobs J1 and J5) associated with the roll type "Type TA" is 2,400 m, whereas the remaining amount of the roll paper of Type TA loaded in the first slot 211 is 500 m. Here, the roll paper of Type TD is required at the latest timing among the four types of roll paper. Therefore, a roll paper loading schedule for replacing the roll paper loaded in the fourth slot 214 with the roll paper of Type TA before the start of printing is created. The remaining amount of the roll paper of Type TA loaded in the first slot 211 becomes 0 during the execution of the job J1, and hence a roll paper loading schedule for loading the roll paper of Type TB into the first slot 211 is created. The roll paper of Type TD is being taken out from the fourth slot 214, so that it is necessary to load the roll paper of Type TD into the slot before the execution of the job J4 is started. In this regard, the remaining amount of the roll paper of Type TB loaded in the second slot 212 becomes 0 during the execution of the job J2, and hence a roll paper loading schedule for loading the roll paper of Type TD into the second slot 212 is created. According to the roll paper loading schedule created as described above, the states of the first to fourth slots 211 to 214 at the printing start time point are, for example, the states illustrated in FIG. 18. In addition, the states of the first to fourth slots 211 after the remaining amount of the roll paper loaded in the first slot 211 becomes 0 by the execution of the job J1 are, for example, the states illustrated in FIG. 19. Note that, since the printing based on the job J1 is continued even during the work of loading the roll paper into the first slot 211, the remaining amount of the roll paper of Type TA loaded in the fourth slot 214 is actually smaller than 10,000 m at the time when the loading of the roll paper of Type TB into the first slot 211 is completed. Further, the states of the first to fourth slots 211 to 214 after the remaining amount of the roll paper loaded in the second slot 212 becomes 0 by the execution of the job J2 are the states illustrated in FIG. 20. Note that, in practice, at the time when the loading of the roll paper of Type TD into the second slot 212 is completed, the remaining amount of the roll paper of Type TB loaded in the first slot 211 is less than 10,000 m.

5.3.4 Fourth Case

Figures 20, 21:
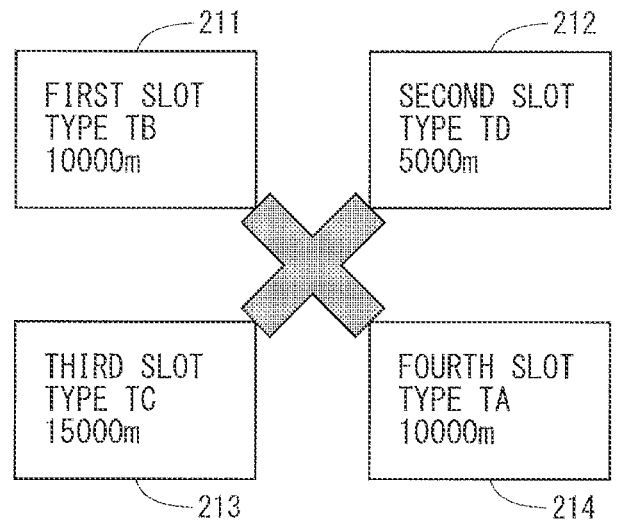
FIG. 20 is a diagram for describing the third case of the specific example concerning the scheduling processing in the embodiment.
FIG. 21 is a diagram for describing a fourth case of the specific example concerning the scheduling processing in the embodiment.

A fourth case is a case where the job execution scheduling is performed in step S152 of FIG. 5. For the fourth case, the following situation is assumed. As illustrated in FIG. 21, six print jobs (jobs J1 to J6) are registered in the job list. The states of the first to fourth slots 211 to 214 in the initial state are as illustrated in FIG. 14. The priority mode has been set to the production time reduction mode. The setting of "replacing the roll paper at an early timing after the start of the continuous printing based on the plurality of print jobs in a case where the roll paper replacement is necessary" has been made.

Figures 22, 23:
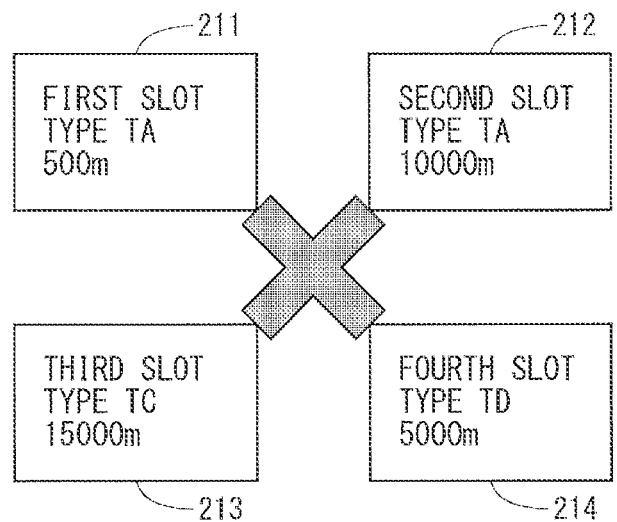
FIG. 22 is a diagram for describing the fourth case of the specific example concerning the scheduling processing in the embodiment.
FIG. 23 is a diagram for describing the fourth case of the specific example concerning the scheduling processing in the embodiment.

In this case, only a job group including the print jobs (jobs J1 and J5) associated with the roll type "Type TA" is the inexecutable job group. In the initial state, there is neither an empty slot nor a slot loaded with a type of roll paper that is not used for printing. It is thus necessary to load the roll paper of Type TA into the slot during execution of printing. Since the priority mode is the production time reduction mode, the printing order is determined so that the job J1 and the job J5 are continuously executed, the job J2 and the job J6 are continuously executed, and the print jobs (jobs J1 and J5) constituting the inexecutable job group are later in the order. Further, the setting of "replacing the roll paper at an early timing after the start of the continuous printing based on the plurality of print jobs in a case where the roll paper replacement is necessary" has been made, and hence the printing order is determined so that the print job associated with the roll type having a shorter total print distance is earlier in the order. From the above, the printing order determined by the scheduling processing is as illustrated in FIG. 22. Concerning the loading of the roll paper of Type TA into the slot, the roll paper of Type TB is not used for printing after the end of printing based on job J6. Thus, a roll paper loading schedule for loading the roll paper of Type TA into the second slot 212 after the end of the printing based on the job J6 is created. According to the roll paper loading schedule, the states of the first to fourth slots 211 to 214 after the end of printing based on the job J6 are, for example, the states illustrated in FIG. 23. Note that, in practice, at the time when the loading of the roll paper of Type TA into the second slot 212 is completed, the remaining amount of the roll paper of Type TC loaded in the third slot 213 is less than 15,000 m.

5.3.5 Fifth Case

A fifth case is a case where the job execution scheduling is performed in step S154 of FIG. 5. For the fifth case, the following situation is assumed. As illustrated in FIG. 24, six print jobs (jobs J1 to J6) are registered in the job list. The states of the first to fourth slots 211 to 214 in the initial state are as illustrated in FIG. 14. The priority mode has been set to the production time reduction mode. The setting of "replacing the roll paper at a later timing from the start of the continuous printing based on the plurality of print jobs in a case where the roll paper replacement is necessary" has been made.

In this case, as in the fourth case, only a job group including the print jobs (jobs J1 and J5) associated with the roll type "Type TA" is the inexecutable job group. In the initial state, there is neither an empty slot nor a slot loaded with a type of roll paper that is not used for printing. It is thus necessary to load the roll paper of Type TA into the slot during execution of printing. Since the priority mode is the production time reduction mode, the printing order is determined so that the job J1 and the job J5 are continuously executed, the job J2 and the job J6 are continuously executed, and the print jobs (jobs J1 and J5) constituting the inexecutable job group are later in the order. Further, the setting of "replacing the roll paper at a later timing from the start of the continuous printing based on the plurality of print jobs in a case where the roll paper replacement is necessary" has been made, and hence the print ordering is determined so that the print job associated with a roll type having a longer total print distance is earlier in the order. From the above, the printing order determined by the scheduling processing is as illustrated in FIG. 25. Concerning the loading of the roll paper of Type TA into the slot, the roll paper of Type TD is not used for printing after the end of printing based on job J4. Thus, a roll paper loading schedule for loading the roll paper of Type TA into the fourth slot 214 after the end of the printing based on the job J4 is created. According to the roll paper loading schedule, the states of the first to fourth slots 211 to 214 after the end of printing based on the job J4 are, for example, the states illustrated in FIG. 13. Note that, in practice, at the time when the loading of the roll paper of Type TA into the fourth slot 214 is completed, the remaining amount of the roll paper of Type TC loaded in the third slot 213 is less than 15,000 m.

5.3.6 Sixth Case

Figures 26, 27:
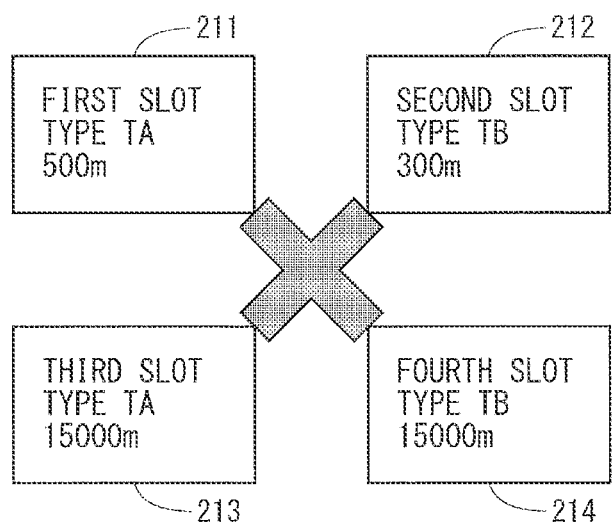
FIG. 26 is a diagram for describing a sixth case of the specific example concerning the scheduling processing in the embodiment.
FIG. 27 is a diagram for describing the sixth case of the specific example concerning the scheduling processing in the embodiment.

A sixth case is a case where the job execution scheduling is performed in step S162 of FIG. 5. For the sixth case, the following situation is assumed. As illustrated in FIG. 26, six print jobs (jobs J1 to J6) are registered in the job list. The states of the first to fourth slots 211 to 214 in the initial state are as illustrated in FIG. 27. The priority mode has been set to the roll specification order mode. The setting of "replacing the roll paper at an early timing after the start of the continuous printing based on the plurality of print jobs in a case where the roll paper replacement is necessary" has been made. The setting of "preferentially using roll paper with a small remaining amount" has been made.

Figures 28, 29:
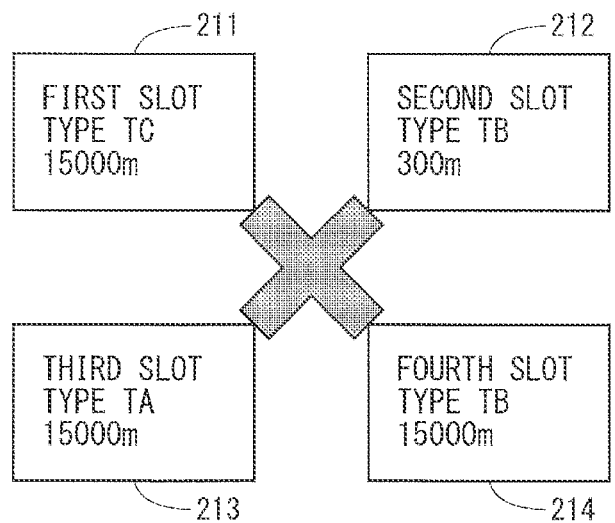
FIG. 28 is a diagram for describing the sixth case of the specific example concerning the scheduling processing in the embodiment.
FIG. 29 is a diagram for describing the sixth case of the specific example concerning the scheduling processing in the embodiment.
Figure 30:
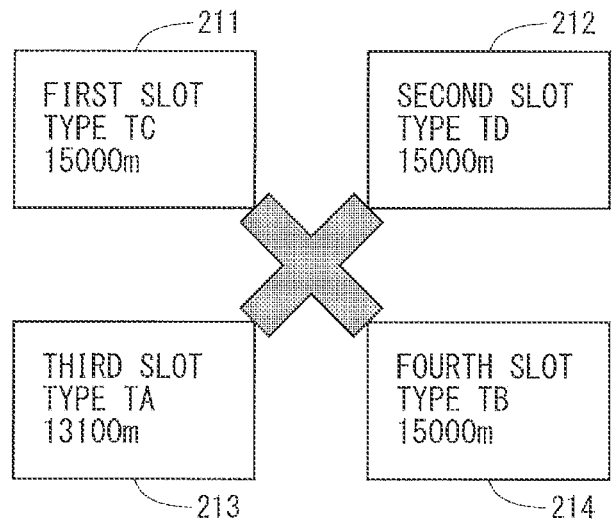
FIG. 30 is a diagram for describing the sixth case of the specific example concerning the scheduling processing in the embodiment.

In this case, a job group including the print job (job J3) associated with the roll type "Type TC" and a job group including the print job (job J4) associated with the roll type "Type TD" are the inexecutable job groups. In the initial state, there is neither an empty slot nor a slot loaded with a type of roll paper that is not used for printing. It is thus necessary to load the roll paper of Type TC and the roll paper of Type TD into the slot during execution of printing. Since the priority mode is the roll specification order mode, the printing order determined by the scheduling processing is as illustrated in FIG. 28. The setting of "preferentially using roll paper with a small remaining amount" has been made, so that the remaining amount of the roll paper of Type TA loaded in the first slot 211 becomes 0 during the execution of the job J1, and the remaining amount of the roll paper of Type TB loaded in the second slot 212 becomes 0 during the execution of the job J2. Thus, a roll paper loading schedule for loading the roll paper of Type TC into the first slot 211 and the roll paper of Type TD into the second slot 212 is created. According to the roll paper loading schedule, the states of the first to fourth slots 211 to 214 after the remaining amount of the roll paper loaded in the first slot 211 becomes 0 by the execution of the job J1 are, for example, the states illustrated in FIG. 29, and the states of the first to fourth slots 211 to 214 after the remaining amount of the roll paper loaded in the second slot 212 becomes 0 by the execution of the job J2 are, for example, the states illustrated in FIG. 30. Note that, in practice, the remaining amount of the roll paper of Type TA loaded in the third slot 213 is less than 15,000 m at the time when the loading of the roll paper of Type TC into the first slot 211 is completed, and the remaining amount of the roll paper of Type TB loaded in the fourth slot 214 is less than 15,000 m at the time when the loading of the roll paper of Type TD into the second slot 212 is completed.

6. About Control of Roll Shaft

Incidentally, the roll paper is manually loaded into each slot of the autochanger 20. In this regard, a configuration may be employed in which a roll shaft supporting the roll paper is controlled as follows so that the loading of the roll paper to be loaded into the loading target slot is quickly performed according to the roll paper loading schedule.

Figure 31:
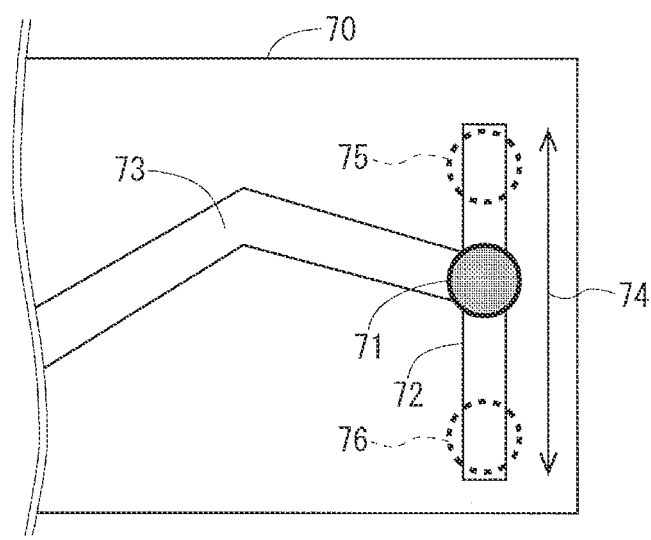
FIG. 31 is a schematic partial cross-sectional view of one slot in the autochanger according to the embodiment.

FIG. 31 is a schematic partial cross-sectional view of one slot in the autochanger 20. A roll shaft 71, a roll shaft moving path 72, and an arm 73 are provided in a housing 70 forming the slot. The roll shaft 71 rotatably supports the roll paper. The position of the roll shaft 71 can be moved in the roll shaft moving path 72 as indicated by an arrow denoted by reference numeral 74 by operating the arm 73. When the roll paper is being supplied to the printer 10, the roll shaft 71 is placed at a position denoted by reference numeral 75 (hereinafter referred to as a "normal position"). At the time of replacing the roll paper, the roll shaft 71 is placed at a position denoted by reference numeral 76 (hereinafter referred to as an "unmount position"). Note that the normal position corresponds to the first position, and the unmount position corresponds to the second position. The autochanger 20 is provided with a roll shaft control unit that controls the position of the roll shaft 71 by moving the arm 73. Then, during the period in which printing is being executed on the basis of the print schedule determined as described above, at the timing when the loading target roll paper is to be loaded into the loading target slot (typically, at the possible loading start time described above), a predetermined instruction signal is provided from the print controller 40 to the roll shaft control unit in the autochanger 20. On the basis of the instruction signal, the roll shaft control unit moves the roll shaft 71 of the loading target slot from the normal position to the unmount position by operating the arm 73 (roll shaft moving step). This enables the operator to quickly replace the roll paper.

7. Effects

According to the present embodiment, in the printing system including the autochanger 20 having the plurality of slots, in a case where it is necessary to load roll paper into a slot during execution of continuous printing, after the determination of the printing order for a plurality of print jobs subject to continuous printing and a loading target slot being a slot into which the roll paper is to be loaded, a possible loading start time that is the earliest time at which the roll paper can be loaded into the loading target slot and a loading start deadline time that is a time indicating when the loading of the roll paper into the loading target slot is to be started at the latest (the latest time at which the loading of the roll paper into the loading target slot is to be started) are obtained. Thus, in a case where the operation of loading the roll paper is required, it is possible to present the time during which the operation is to be performed to the operator, and hence the operator can load the roll paper into the loading target slot quickly so that the printing operation is not stopped. As above, according to the present embodiment, in the printing system including the autochanger 20, it is possible to prevent a decrease in printing productivity due to switching of roll paper to be used for printing and loading of roll paper into a slot.

8. Others

Although the present invention has been described in detail above, the above description is illustrative in all aspects and is not restrictive. It is understood that numerous other modifications and variations can be devised without departing from the scope of the present invention. For example, although an autochanger having four slots is exemplified in the above embodiment, the present invention can be applied so long as an autochanger having two or more slots is employed. Further, although three modes are prepared as the modes that can be set as the priority modes in the above embodiment, all of the three modes are not necessarily prepared, and modes other than the three modes may be prepared.

This application is an application claiming priority based on Japanese Patent Application No. 2022-049274 entitled "Printing Method, Printing System, And Print Control Program" filed on Mar. 25, 2022, and the contents of which are herein incorporated by reference.

What is claimed is:

1. A printing method in a printing system including a printer configured to perform printing on continuous paper and an autochanger including a plurality of slots each holding a roll paper and a switching mechanism that automatically switches a slot from which a roll paper to be supplied to the printer is drawn, the autochanger being configured to supply a roll paper drawn from any one of the plurality of slots to the printer as the continuous paper, the printing method comprising:
    a print job registration step of registering a plurality of print jobs to be executed by the printer in a job list;
    a scheduling step of creating a print schedule including a job execution schedule defining an execution order of the plurality of print jobs and a roll paper loading schedule defining a schedule for using a roll paper loaded in each of the plurality of slots and a schedule for loading a roll paper into each of the plurality of slots on a basis of a type and a remaining amount of roll paper loaded in each of the plurality of slots, a type of roll paper necessary for execution of each of the plurality of print jobs, and a print distance of each of the plurality of print jobs; and
    a possible loading time calculation step of obtaining, on a basis of the print schedule, a possible loading time that is a time at which a roll paper is loadable into a loading target slot being a slot into which a roll paper is to be loaded during execution of continuous printing based on the plurality of print jobs among the plurality of slots.

2. The printing method according to claim 1, wherein the possible loading time calculation step includes
    a possible loading start time calculation step of obtaining a possible loading start time that is the earliest time at which a roll paper is loadable into the loading target slot, and
    a loading start deadline time calculation step of obtaining a loading start deadline time that is the latest time at which the loading of a roll paper into the loading target slot is to be started.

3. The printing method according to claim 2, further comprising a required roll replacement time registration step of registering a required roll replacement time that is a time required for replacement of a roll paper by an operator in a slot included in the autochanger,
    wherein in the loading start deadline time calculation step, a time earlier by the required roll replacement time than a scheduled time at which printing on a roll paper after replacement is started is obtained as the loading start deadline time.

4. The printing method according to claim 2, further comprising an information transmission step of transmitting information indicating that a roll paper is to be loaded into a slot to an information transmission destination specified in advance when the possible loading start time comes.

5. The printing method according to claim 2, wherein
    each of the plurality of slots has a roll shaft that rotatably supports a roll paper,
    the roll shaft is configured to be movable between a first position that is a position at which a roll paper is supplied to the printer, and a second position that is a position for replacing a roll paper, and
    the printing method further comprises a roll shaft moving step of moving the roll shaft of the loading target slot from the first position to the second position at the possible loading start time.

6. The printing method according to claim 1, further comprising a job grouping step of grouping the plurality of print jobs for each type of roll paper necessary for executing the plurality of print jobs to generate a plurality of job groups,
    wherein in the scheduling step, the job execution schedule is created so that two or more print jobs included in the same job group are executed in succession.

7. The printing method according to claim 6, further comprising a job group classification step of classifying the plurality of job groups into an executable job group that is a job group including only a print job enabling completion of printing using one or more roll papers loaded in the plurality of slots and an inexecutable job group that is a job group including a print job not enabling completion of printing in a case in which only one or more roll papers loaded in the plurality of slots are used,
wherein in the possible loading time calculation step, the possible loading time is obtained by taking a slot into which a roll paper necessary for executing a print job included in the inexecutable job group is to be loaded as the loading target slot.

8. The printing method according to claim 7, further comprising a priority mode setting step of setting one of a plurality of modes prepared in advance as a priority mode, wherein
the plurality of modes prepared in advance includes a production time reduction mode that gives priority to a reduction in time required to execute continuous printing based on the plurality of print jobs, and
when the production time reduction mode is set as the priority mode in the priority mode setting step, the job execution schedule is created so that a print job included in the executable job group is executed earlier than a print job included in the inexecutable job group in the scheduling step.

9. The printing method according to claim 8, further comprising a roll replacement timing setting step of setting whether to replace a roll paper at an early timing after start of continuous printing based on the plurality of print jobs or to replace a roll paper at a later timing from start of continuous printing based on the plurality of print jobs, wherein
when the production time reduction mode is set as the priority mode in the priority mode setting step, and a setting of replacing a roll paper at an early timing after start of continuous printing based on the plurality of print jobs is made in the roll replacement timing setting step, the job execution schedule is created so that, for the executable job group, a print job included in a job group having a shorter total print distance is executed earlier than a print job included in a job group having a longer total print distance in the scheduling step, and
when the production time reduction mode is set as the priority mode in the priority mode setting step, and a setting of replacing a roll paper at a later timing from start of continuous printing based on the plurality of print jobs is made in the roll replacement timing setting step, the job execution schedule is created so that, for the executable job group, a print job included in a job group having a longer total print distance is executed earlier than a print job included in a job group having a shorter total print distance in the scheduling step.

10. The printing method according to claim 1, further comprising a priority mode setting step of setting one of a plurality of modes prepared in advance as a priority mode,
wherein in the scheduling step, the job execution schedule is created in accordance with the priority mode.

11. The printing method according to claim 1, further comprising a loading information notification step of notifying loading information including the possible loading time.

12. The printing method according to claim 11, wherein the autochanger includes a display unit, and
in the loading information notification step, the loading information is displayed on the display unit.

13. The printing method according to claim 11, wherein in the loading information notification step, the loading information is transmitted to a previously specified information transmission destination.

14. A printing system comprising:
a printer configured to perform printing on continuous paper;
an autochanger including a plurality of slots each holding a roll paper and a switching mechanism that automatically switches a slot from which a roll paper to be supplied to the printer is drawn, the autochanger being configured to supply a roll paper drawn from any one of the plurality of slots to the printer as the continuous paper;
a print job registration unit configured to register a plurality of print jobs to be executed by the printer in a job list;
a scheduling unit configured to create a print schedule including a job execution schedule defining an execution order of the plurality of print jobs and a roll paper loading schedule defining a schedule for using a roll paper loaded in each of the plurality of slots and a schedule for loading a roll paper into each of the plurality of slots on a basis of a type and a remaining amount of roll paper loaded in each of the plurality of slots, a type of roll paper necessary for execution of each of the plurality of print jobs, and a print distance of each of the plurality of print jobs; and
a possible loading time calculation unit configured to obtain, on a basis of the print schedule, a possible loading time that is a time at which a roll paper is loadable into a loading target slot being a slot into which a roll paper is to be loaded during execution of continuous printing based on the plurality of print jobs among the plurality of slots.

15. A non-transitory computer-readable recording medium recording a print control program executed in a printing system including a printer configured to perform printing on continuous paper, an autochanger including a plurality of slots each holding a roll paper and a switching mechanism that automatically switches a slot from which a roll paper to be supplied to the printer is drawn, and a print controller configured to control an operation of the printer and an operation of the autochanger, the autochanger being configured to supply a roll paper drawn from any one of the plurality of slots to the printer as the continuous paper, wherein the print control program causes a computer constituting the print controller to execute:
a print job registration step of registering a plurality of print jobs to be executed by the printer in a job list;
a scheduling step of creating a print schedule including a job execution schedule defining an execution order of the plurality of print jobs and a roll paper loading schedule defining a schedule for using a roll paper loaded in each of the plurality of slots and a schedule for loading a roll paper into each of the plurality of slots on a basis of a type and a remaining amount of roll paper loaded in each of the plurality of slots, a type of roll paper necessary for execution of each of the plurality of print jobs, and a print distance of each of the plurality of print jobs; and
a possible loading time calculation step of obtaining, on a basis of the print schedule, a possible loading time that is a time at which a roll paper is loadable into a loading target slot being a slot into which a roll paper is to be loaded during execution of continuous printing based on the plurality of print jobs among the plurality of slots.

* * * * *